United States Patent [19]
Fortsch

[11] 3,747,164
[45] July 24, 1973

[54] RELEASABLE SELF-LOCKING BUNDLING STRAP

[75] Inventor: William A. Fortsch, Livingston, N.J.

[73] Assignee: Thomas & Betts Corporation, Elizabeth, N.J.

[22] Filed: Nov. 1, 1972

[21] Appl. No.: 302,863

[52] U.S. Cl. .............................................. 24/16 PB
[51] Int. Cl. .............................................. B65d 63/00
[58] Field of Search ............... 24/17 AP, 30.5 P, 24/20 TT, 73 PB, 16 PB; 248/74 PB

[56] References Cited
UNITED STATES PATENTS

| | | | |
|---|---|---|---|
| 2,203,728 | 6/1940 | Hutchinson | 24/16 PB UX |
| 3,102,311 | 9/1963 | Martin et al. | 24/16 PB |
| 3,152,219 | 10/1964 | Murray et al. | 248/74 PB X |
| 3,224,056 | 12/1965 | Joffe | 24/16 PB |
| 3,266,109 | 8/1966 | Thomas | 24/20 TT |
| 3,653,099 | 4/1972 | Hoffman | 24/16 PB |
| 3,654,669 | 4/1972 | Fulton | 24/16 PB |

FOREIGN PATENTS OR APPLICATIONS

| | | | |
|---|---|---|---|
| 518,012 | 3/1953 | Belgium | 24/16 PB |
| 1,014,768 | 12/1965 | Great Britain | 24/16 PB |
| 153,565 | 6/1932 | Switzerland | 24/20 TT |

OTHER PUBLICATIONS 1144979 3/1963 German Printed Application T-C

Primary Examiner—Donald A. Griffin
Attorney—David Teschner et al.

[57] ABSTRACT

A releasable self-locking bundling strap which is locked by the rotation of a head member in a first direction and released by the rotation of the head member in a second, opposite direction. The strap body portion is fabricated with oppositely oriented teeth on opposite planar surfaces of the body and of a width and thickness to permit both ends of the body portion to be placed through the aperture in the head member. Complementarily oriented teeth are placed on the top and bottom bounding surfaces of the head member aperture. In the released position the head member teeth do not engage the body portion teeth permitting free movement of the body portion. Rotation of the head member causes locking engagement between the head member teeth and body portion teeth. Various tooth combinations, head configurations, and ancillary structures are also described.

23 Claims, 26 Drawing Figures

PATENTED JUL 24 1973
3,747,164
SHEET 1 OF 3
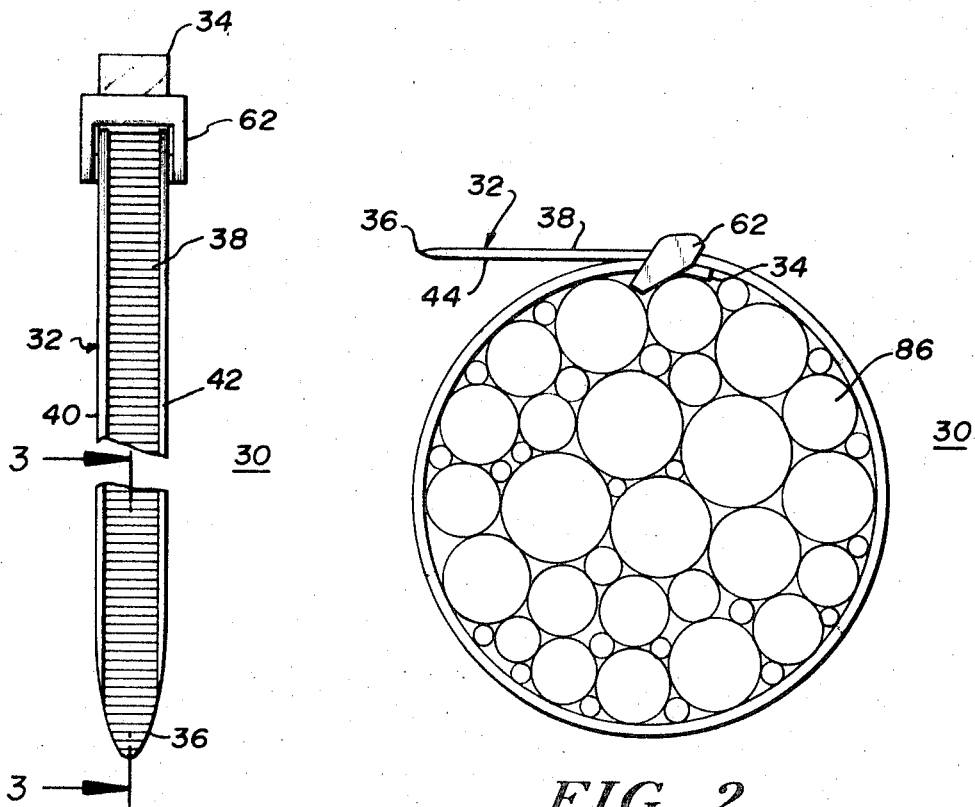
FIG. 1
FIG. 2
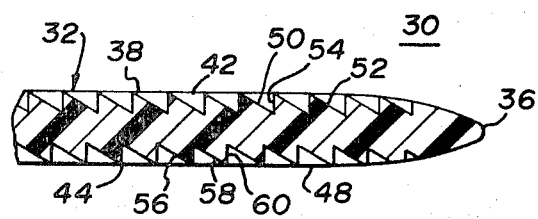
FIG. 3
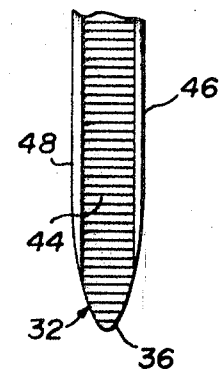
FIG. 1A
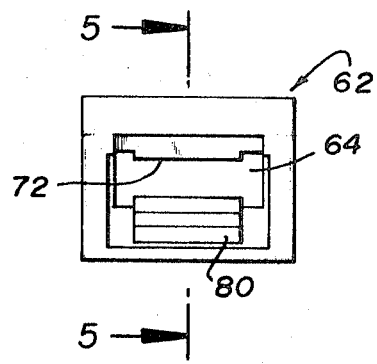
FIG. 4
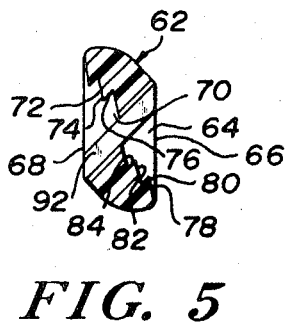
FIG. 5

RELEASABLE SELF-LOCKING BUNDLING STRAP

BACKGROUND OF THE INVENTION

1. Field of the Invention

The invention relates to the field of bundling discrete articles into article bundles and may find particular utility in the bundling of individual conductors into cables.

2. Description of the Prior Art

According to prior art devices there are provided plastic bundling straps having an elongated strap body portion arranged to be looped about a plurality of conductors to be formed into a bundle and then placed through an aperture in a head member. Then by means of twisting the end of the strap body portion protruding through the head member, or by the use of unidirectional locking means, the strap body portion is locked against unwanted removal by the strap body portion, from the head portion, which would permit disengaging the strap. For many applications once a cable has been formed it is not necessary to go back and in any manner change individual conductors within such cable. However, upon occasion, it is necessary to modify the cable due to the addition of conductors, or the removal of conductors therefrom. Under such conditions, the prior art devices had to be cut to permit release thereof, thus destroying their utility and requiring new bundling straps to be employed when the cable was reformed.

Recently, some plastic bundling straps have been made available which have a releasable feature. These generally include a tab connected to the locking means by which the locking means may be withdrawn from its locking position to permit the strap body portion to be withdrawn from the head member and the loop formed by the strap body portion to thus be opened. However, certain difficulties have been found with such devices, namely, it is often possible to position the strap about the bundle in such a manner that free access to the tab is not possible. Also, it is possible to break the tab during installation and thereby render the strap nonreleasable. Additionally, it has been found that too much force exerted upon the tab often results in the breaking of the locking means itself, thus rendering the strap useless and requiring it to be replaced.

SUMMARY OF THE INVENTION

The present invention overcomes the difficulties noted above with respect to prior art devices by providing a releasable self-locking bundling strap whose head member can be rotated in a first direction to a first position to allow the free insertion of the body portion of the strap in order to form the desired closed loop about the individual conductors, to be formed into the bundle, and then, by the simple expediency of rotating the head member in a second opposite direction, to cause the locking engagement of the head member with the strap portion preventing unwanted withdrawal of the strap body portion and the opening of the loop formed thereby. Further, by the unique formation of the rotating head member, the tension produced in the strap body portion, by its being tightened about the bundle, provides the necessary forces upon the head member to cause rotation in the locking direction to the locking position and further, any additional forces exerted upon the strap in the direction of withdrawal will tend to cause the head member to rotate in the locking direction to further increase the locking ability of the head member with respect to the strap body.

This desired result is achieved by providing a strap body portion having a first planar surface in which are placed a plurality of first teeth oriented in a first direction and on the second, opposite, planar surface of the strap body portion, a second series of teeth oriented in a second direction opposite to that of the first teeth on the first planar portion. Flanking ribs are mounted on the marginal edges of the strap body portion on both the first and second planar surfaces to provide additional strength to the strap body portions and to prevent contact with the teeth flanking edges. A head member is provided with a transverse aperture placed therethrough. Extending from a first bounding surface into the aperture within the head member are a first plurality of teeth, oriented in the first direction. Similarly, extending from a second bounding surface, opposite to the first bounding surface of the head member, are yet another set of teeth, oriented in the second direction. By inserting the strap body portion within the head member, and rotating said head member in said second direction, engagement is caused between the second teeth on the second planar surface of the strap body portion with the teeth of the first bounding surface of the head member, locking the strap body portion and the head member. The tail end portion of the strap body portion may then be moved about the individual conductors to be formed into a cable and reinserted through the aperture, within the head member, with the head member rotated in the first direction and upon rotation of the head member in the second direction, the teeth on the second bounding surface of the head member engage the oppositely oriented teeth on the first planar surface of the trap body portion in locking engagement. With the head member rotated in the second direction there exists no interference between the teeth on the first bounding surface of the head member and the second planar surface of the strap body portion and the teeth on the second bounding surface of the head member and the teeth on the first planar surface of the strap body portion and the strap may be tightened to the desired tension.

With the tension which exists within the strap itself, as a result of tightening about the cable and which tends to pull the strap out of the head member, the head member is caused to rotate in the second direction and cause the engagement of the teeth on the first bounding surface of the head member with the second teeth of the second planar surface of the strap body portion and the teeth on the second bounding surface of the head member with the first teeth on the first surface of the strap body portion preventing withdrawal of the strap body portion from the head member. The application of any additional tesnion to the strap, in a direction tending to withdraw the strap body portion from the head member, will only cause further rotation of the head member in the second direction, and thus further locking action between the teeth on the head member and the body portion. However, at will, the head body member may be rotated in the first direction to release the engagement between the respective teeth of the head member and body portion to permit withdrawal of the strap body portion opening or loosening the completed loop. To prevent the possible complete separation of the strap body portion, and the head member, which might result in the loss of the head member, various techniques may be used to assemble the head member to a first end of the trap body portion preventing their total separation but still leaving the head member free to rotate, as described above. The teeth employed, on the various members described, immediately take on the shape of a sawtooth having a smooth leading surface, and a generally perpendicular rear surface. However, this may be varied as necessary, or desirable, for the particular locking action required. It is therefore an object of this invention to provide an improved form of bundling strap.

It is another object of this invention to provide an improved form of releasable self-locking bundling strap.

It is yet another object of this invention to provide a releasable self-locking bundling strap which can be engaged and released without the requirement for additional tooling.

It is yet another object of this invention to provide a releasable self-locking bundling strap having an elongated body portion and a head member and whose body portion can be locked in a closed looped arrangement by the mere expedient of rotation of the head member in a second direction and released by rotation of the head member in a first, opposite direction.

Further objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWING

In the Drawings in which similar elements are given similar reference characters.

FIG. 1 is a top plan view of a strap constructed in accordance with the concepts of the invention with the strap body portion foreshortened.

FIG. 1A is a fragmentary bottom plan view of the tip portion of the bundling strap of FIG. 1.

FIG. 2 is a side elevational view of the strap of FIG. 1 looped about a plurality of conductors to form a cable.

FIG. 3 is a fragmentary side elevational view, in section, of the tip portion of the bundling strap of FIG. 1 taken along the lines 3—3 of FIG. 1.

FIG. 4 is a front elevational view of the head member of the strap of FIG. 1.

FIG. 5 is a side elevational view of the head member of FIG. 4 taken along the lines 5—5.

DESCRIPTION OF THE PREFERRED EMBODIMENTS

Figure 6:
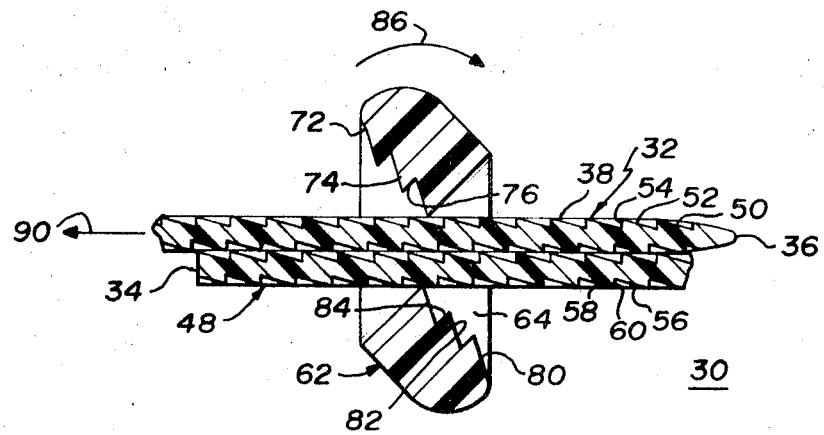
FIG. 6 is a fragmentary side elevational view, in section, showing portions of the body portion of the strap of FIG. 1 showing the position of the head member during the insertion and tightening of the strap body portion about a plurality of conductors, as is shown in FIG. 2.

Turning now to FIGS. 1, 1A, 2, 3, and 4 there is shown a releasable self-locking bundling strap 30 constructed in accordance with the concepts of the invention. Bundling strap 30 has an elongated strap body portion 32 square cut at a first end 34 and a tapered tail end portion 36 at the second end thereof. Said body portion 32 has a first planar surface 38 flanked by two marginal ribs 40 and 42. In a similar manner, as is shown in FIG. 1A, the underside of the strap body portion 32 is a second planar surface 44 having a pair of marginal ribs 46 and 48 thereon. As is best seen in FIG. 3, the first planar surface 38 has a first plurality of teeth 50, having inclined leading surfaces 52, inclined towards the right of FIG. 3, and trailing edges 54 which extend generally perpendicular to the planar surface 38. In a similar fashion, a second plurality of teeth 56 extend within the second planar surface 48 having leading edges 58 inclined towards the left of FIG. 3 and trailing edges 60 which extend generally perpendicular to the planar surface 48.

Turning now to FIGS. 1, 4, and 5 the details of the locking head members 62 can be better appreciated. As is shown in FIGS. 4 and 5a, transverse aperture 64 extends from the front face 66 to the rear face 68 of the head member 62. From the top bounding surface 70 there extend a plurality of teeth 72 having leading edges 74 inclined towards the left of FIG. 5 and trailing edges 76 generally perpendicular with respect to the bounding surface 70. In a similar fashion, the lower bounding surface 78 has a plurality of teeth 80 thereon, the leading edges 82 thereof being inclined towards the right of FIG. 5 and have trailing edges 84 generally perpendicular to the surface 78. In a manner to be described below, with reference to FIGS. 6 and 7, the head member 62 is caused to engage strap body portion 32 adjacent the end 34 thereof and the remainder of body portion 32 is then wrapped about a plurality of articles 86, as is shown in FIG. 2, and thence the tail end portion 36 is threaded through the transverse aperture 64 of the head member 62 and pulled up tight to form a closely knit bundle, as is shown in FIG. 2.

Figure 7:
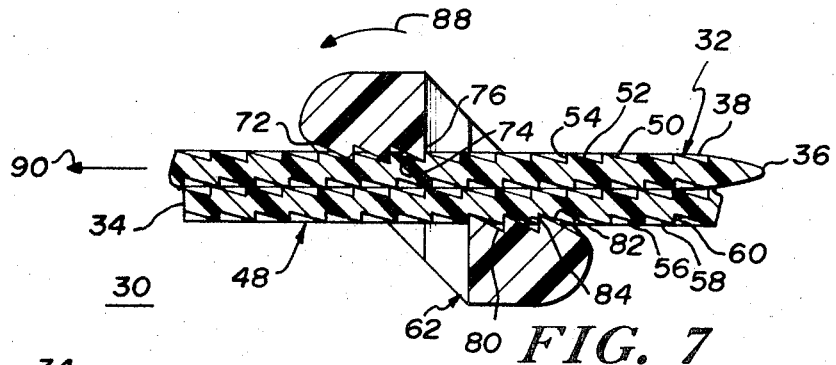
FIG. 7 is a fragmentary side elevational view, in section, of portions of the bundling strap of FIG. 1 showing the head member rotated to the locking position to prevent separation of the strap body portions.

Turning now to FIGS. 6 and 7, the manner of operation of the strap 30, described above with respect to FIGS. 1 through 5 may be better understood. The end 34 of the strap body portion 32 is fed into the head member 62, with the head member 62 maintaining a position generally perpendicular with respect to the plane of the body portion 32 and the tail end portion 36 is then wrapped about a plurality of articles such as the articles 86 of FIG. 2 to be bundled by means of the strap 30, and then fed through the transverse aperture 64 in order to form a closed loop. Head member 62 is held in this position to insure that the teeth 72 of the head member 62 does not engage the teeth 50 of the strap member 32. With this arrangement of the respective teeth, noted above, the portions of the strap body portion 32 are permitted to freely move with respect to one another in order that the strap 30 be drawn tightly about the articles 86 to be bundled. Once the desired tension, as in the cable bundle shown in FIG. 2, has been reached, the head member 62 is rotated in the direction of the arrow 88 (see FIG. 7). Due to the rotation, in the direction of the arrow 88, the respective teeth 72 of the upper bounding surface of the head member 62 are caused to engage the teeth 50 in the first planar surface 38 of the strap body portion 32, and the teeth 80, on the lower bounding surface of the head member 62 are caused to engage the teeth 56 in the second planar surface 48 of the strap body portion 32. In this manner, any forces tending to cause withdrawal of the strap tail end portion 36 from the head member 62, in the direction of the arrow 90, only serve to further rotate the head member 62 in the direction of the arrow 88 and thus increase the holding power, with respect to the head member 62 and strap body portion 32. Similarly, in FIG. 6, any forces in the direction of the arrow 90 will immediately cause rotation of the head member 62 in the direction of the arrow 88, in FIG. 7, and begin the locking operation. Thus, in a sense, the strap 30 is self-acting in that once it is drawn tight any attempt to withdraw the strap tail end portion 36, including any resulting tension within the strap 30 tending to spread the strap 30, will cause the immediate rotation of the head member 62 to a locking position preventing withdrawal of the strap body portion 32 therefrom. Even in a locked position, because of the inclination of the teeth 50 of the first planar surface 38 of the strap portion 32 and the teeth 72 of the upper bounding surface of the head member 62, it is still possible to pull the strap body portion 32 tighter about the bundle of objects 86, as is shown in FIG. 2.

The strap 30, once locked, as described above with respect to FIG. 7, may be released at will by simply rotating the head member 62 in the direction of arrow 86 of FIG. 6. This rotation of the head member 62 causes the teeth 72 of the upper bounding surface 70 of the head member 62 to disengage from the teeth 50 of the first planar surface 38 of strap body portion 32 and the teeth 80 of the lower bounding surface 78 of the head member 62 to disengage from the teeth 56 of the second planar surface 44, as is shown in FIG. 6, thus permitting withdrawal of the tail end portion 36 of the body portion 32 from the aperture 64 of the head member 62, and the consequent opening of the loop. Similarly, if desired, the loop may be loosened by the same technique.

Figure 8:
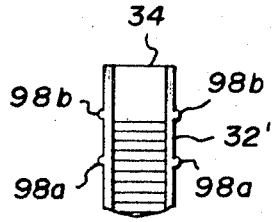
FIG. 8 is a fragmentary top plan view of a portion of a strap body showing a modification for locking the strap body portion to the head member.
Figure 10:
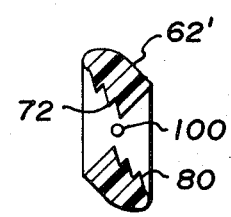
FIG. 10 is a side elevational view, in section, showing a modified head member construction.

Turning again to FIG. 5, and considering FIG. 8, there is shown means to lock the first end 34 of the strap body portion 32' to the head member 62. Coupled to the side walls of the head member 62, as is best seen in FIG. 5, are a pair of ribs 92 (only one of which is visible in FIG. 5) which will be entrapped between the protrusions 98, as shown in FIG. 8. In production, the first pair of protrusions 98a will be fabricated in the area adjacent the end portion 34 of the strap body portion 32' and the head member 62 placed thereon. Then, the protrusions 98b will be formed to restrict the movement of the ribs 92 to the region between the protrusions 98a and 98b. Further, due to the resiliency of the strap body portion 32', it is possible to preform the protrusions 98a and 98b and snap the head member 62 into position with the ribs 92 in the interspace between the protrusions 98a and 98b. In this manner, the head member 62 is free to be rotated in the directions 86, as shown in FIG. 6, and 88, as shown in FIG. 7. Alternatively, a head member 62' can be fabricated with a detent button 100 fabricated in each of its side walls (see FIG. 10) to permit the strap body portion 32 to be positioned with its end 34 adjacent the head member 62' and then snapped into position below the detent buttons 100 so that engagement is assured between the teeth 56 of the second planar surface 48 and the teeth 80 of the lower portion of the head member 62'. Sufficient clearance, however, is provided between the teeth 80 of the head member 62' and the detent button 100 to permit rotation of the head 62' in the direction shown by the arrow 86, of FIG. 6, to permit a portion of the strap body portion 32 of the strap 30 to be pulled through the head member 62' without engagement between the teeth 50 of the upper planar surface 38 of the body portion 32 and the teeth 72 of the upper bounding surface 70 of head member 62'.

Figure 9:
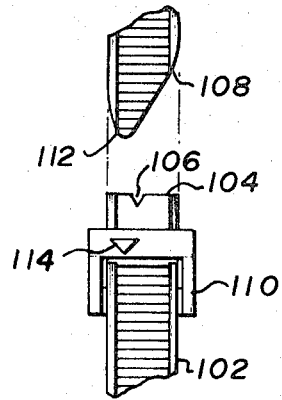
FIG. 9 is a fragmentary top plan view of a further embodiment of the device constructed in accordance with the concepts of the invention and having the strap body portion foreshortened.

Turning now to FIG. 9, there is shown a modified strap body portion 102, having at an end 104 a notch 106 which, as will be described below, is employed to assist the assembler in positioning the tail end portion 108, of the strap body portion 102, in the head member 110. The tail end portion 108, of the strap body portion 102, has an offset tapered end 112 and the head member 110 has an assembling indicator 114 placed thereon. The notch 106, the offset tail portion 112, and the assembly indicator 114 will be used to properly assemble the strap body portions 102 so that the planar surfaces may freely move with respect to one another and to insure proper engagement between the teeth of the strap body portion 102 and the teeth within the head member 110. In order to properly assemble the strap body portion 102, the tapered tail portion 112 is directed approximately midway between the apex of the assembly indicator 114 and the notch 106 in the end 104 of the strap body portion 102. Strap body portion 102 may then be tightly drawn about the bundle so that proper alignment between the respective teeth of the strap body portion 102 and of the head 110 is assured.

Figure 12:
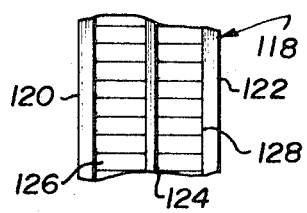
FIG. 12 is a fragmentary top plan view of a portion of yet another modified strap body.
Figure 13:
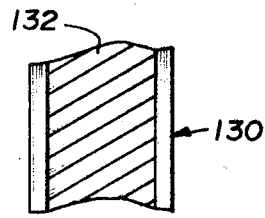
FIG. 13 is a fragmentary top plan view of a portion of yet another strap body.
Figure 14:
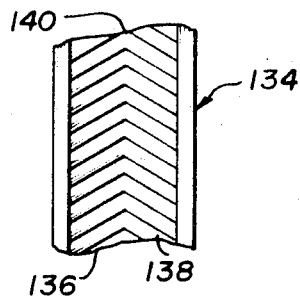
FIG. 14 is a fragmentary top plan view of a further modification of a strap body.

As has been shown in FIGS. 1, 1A, 8 and 9, the teeth 50 and 56 of the first and second planar surfaces 38 and 48 respectively are extended in a direction across the width of the strap body portion 32 between the respective ribs 38 and 40, on the first planar surface 38, and between the ribs 46 and 48 of the second planar surface 44. However, such is not necessary for proper operation of the strap. It is possible, as is shown in FIG. 12, to have a strap body portion 118, having a third rib 124 dividing the width of the strap between the marginal ribs 120 and 122 into two segments, each having a set of teeth 126 and 128 respectively. To facilitate use of these teeth, it may be necessary for the teeth 72 and 80 of the head member 62 of FIG. 6 to be bifurcated to provide sufficient clearance for the passage therethrough of the rib 124. Alternatively, the rib 124 may be made below the surface of the adjacent teeth 126 and 128, in which case no clearance is necessary within the teeth 72 and 80 of the head member 62. As shown in FIG. 13, the teeth 132 may be placed in strap body portion 134 offset with respect to the longitudinal axis of the strap body portion 130. Also, a chevron pattern may be established as is shown in FIG. 14. A first segment of the strap body portion 134 may have teeth 136 inclined to the left of FIG. 14 and a second segment of teeth 138 inclined to the right of FIG. 14 with their edges meeting along the longitudinal axis as at 140. The various configurations shown in FIGS. 12, 13, and 14 provide desirable insertion and withdrawal characteristics chosen for particular needs.

Figure 11:
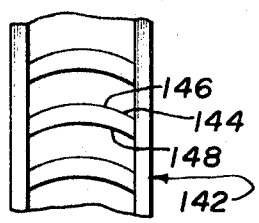
FIG. 11 is a fragmentary top plan view of a portion of a modified strap body.
Figure 15:
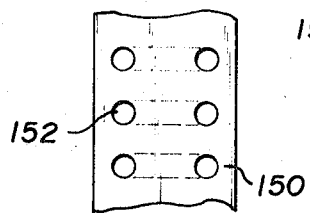
FIG. 15 is a fragmentary top plan view of a portion of still another modified strap body.
Figure 16:
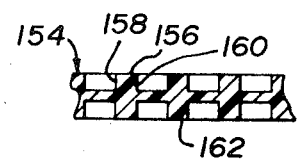
FIG. 16 is a fragmentary side elevational view, in section, of a portion of a modified strap body.
Figure 17:
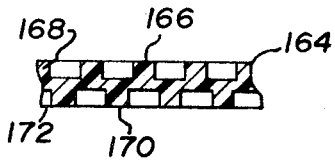
FIG. 17 is a fragmentary side elevational view, in section, of a portion of yet another modified strap body.

Up to this point, the various teeth 50, 56, 72 and 80 have been shown as generally saw-toothed having inclined leading edges and trailing surfaces 54, 60, 76 and 84 respectively, each appearing generally perpendicular to the planar surface in which they extend. It is not essential that the trailing edges be completely perpendicular with respect to their planar surfaces. They may be inclined themselves, either at acute or obtuse angles, as is necessary or desirable for their particular application. Also, it is possible, as is shown in FIG. 11, to provide generally curvilinear teeth 144 with respect to a strap body portion 142. The leading edges of the respective teeth 146 will be smooth, arcuate segments followed by inclined trailing edges 148. Also, it is possible to provide a series of cylindrical teeth 152, as shown on the strap body portion 150 in FIG. 15. The teeth may also be fabricated having perpendicular leading and trailing edges as is shown in FIG. 16, wherein a strap body portion 154 has a series of teeth 156 in its first planar surface. The leading edges 158 and trailing edges 160 are each arranged generally perpendicular to the planar surface from which they depend. In a similar fashion the teeth 162 formed on the second planar surface are also fabricated with perpendicular leading and trailing edges. The teeth of the first and second planar surfaces disclosed herein have been aligned generally with respect to their position in the upper and lower planar surfaces. However, these teeth may be arranged in offset fashion, as is shown in FIG. 17, depicting a strap body portion 164. The teeth 166, extending from the first planar surface 168 are offset with respect to the teeth 170, extending from the second planar surface 172. The offset pattern, as is shown in FIG. 17, may be employed to change the strength characteristics of the strap.

Figure 18:
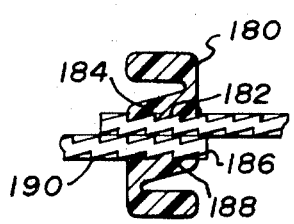
FIG. 18 is a side elevational view, in section, of a modified head member and portions of the strap body assembled therewith.
Figure 19:
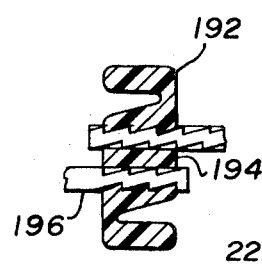
FIG. 19 is a side elevational view, in section, of a further modified head member and strap body portions assembled thereto.
Figure 24:
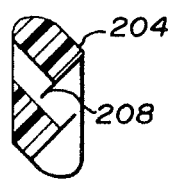
FIG. 24 is a side elevational view, in section, of a further modification of the head member of the instant invention.
Figure 25:
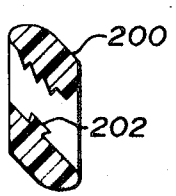
FIG. 25 is a side elevation, in section, of still another modified head member of the invention.

The various teeth 72, and 80, shown upon the head member 62 of FIG. 7 are rigidly mounted to such head member 62. However, it is possible to also provide a more flexible mounting of the teeth within the head member, as is shown in FIGS. 18 and 19. In FIG. 18 there is shown a head member 180 having a series of teeth 182 mounted upon a flexible pawl 184 and a second set of teeth 186 mounted on a second flexible pawl 188. The strap body portion 190, having appropriate teeth thereon, is locked to the respective teeth 182 and 186, as was described above with respect to FIGS. 6 and 7. However, in this arrangement greater rotation of the head member 180 is necessary for the locking and unlocking operation since the flexible pawls 184 and 188 to some degree follow the movement of strap body portion 190 and thus produce greater resistance to unwanted release of the strap body portion 190 as by accidental engagement of the head member 180 with an adjacent bundle. As shown in FIG. 19, a spacer 194 is provided within the head member 192 to permit the individual locking and unlocking of the portions of the strap body portion 196 so that the strap can be easily released without separating the head portion 192 from the strap portion 196. Alternatively, as is shown in FIG. 25, a head member 200 is provided, having a locking tab 202 upon its lower bounding surface to engage a complimentary recess in a strap body portion (not shown). In this manner, separation between the head member 200 and the strap body portion will not occur during normal loop releasing. Further, the molded teeth of the head member may be totally replaced. As is shown in FIG. 24, a series of metallic barbs 208 are placed on the head member 204. The barbs 208 are of the unidirectional type permitting the strap body portions to be moved with respect to the barbs 208 in a first direction without a locking engagement therewith. Upon attempted withdrawal the barbs 208 will bite into the material of the strap body portion and will prevent disengagement therewith.

Figure 20:
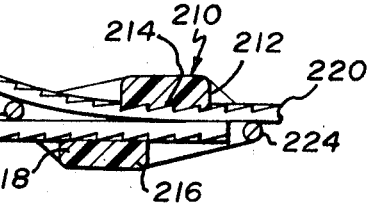
FIG. 20 is a side elevational view, in section of still another modified bundling strap constructed in accordance with the invention and showing portions of the strap body assembled therewith.
Figure 21:
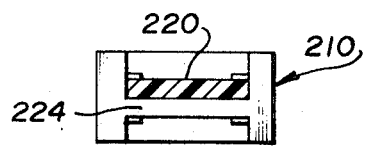
FIG. 21 is a front elevational view of the modified head member of FIG. 20 showing a portion of the strap body in section.
Figure 22:
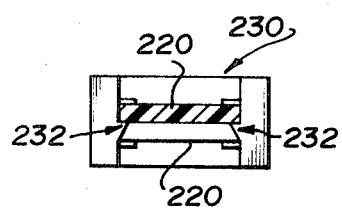
FIG. 22 is a front elevational view of a further modified head member showing the strap portions inserted therein, in section.
Figure 23:
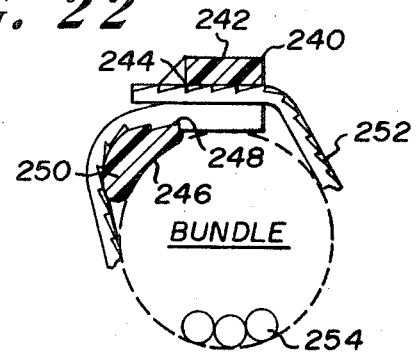
FIG. 23 is a side elevational view, in section, showing the head member and a portion of the strap body of yet another modified strap assembled.

When it is intended to bundle a rather small number of individual conductors into a cable, or it is desired to make the overall head member small, a modification of the head member is necessary in order to prevent unwanted unlocking of the strap. One such modification is shown in FIG. 20, where a head member 210 is fabricated with an upper bounding surface 212 upon which are placed teeth 214 and lower bounding surface 216 upon which are placed teeth 218 to engage the teeth of the body portion 220. In a very small bundle it would be possible for the positions taken on by the strap body portion 220 to be such as to unlock the strap body portion 220 from the teeth 214 and 218 respectively. However, to insure that there will be proper contact between the teeth of the strap body portion 220 and the teeth 214 and 218 of the head member 210, additional supports 222 and 224, in the form of outriggers, are added to the head member 210. Support 222 is arranged to keep the strap body portion 220 in contact with the teeth 218 of the lower bounding surface 216, whereas the support 224 serves to keep the strap body portion 220 in contact with the teeth 214 of the upper bounding surface 212 of the head 210. Support members 222 and 224 may extend all the way across the head member 210, as is shown in FIG. 24, or may extend only for a portion of the width of the head member, as is shown in FIG. 22. From the head member 230 generally extend ribs 232 intermediate side walls and partially blocking the transverse aperture through the head member 230. The ribs 232 are sufficient to receive thereon and support strap body portions 220 to keep the respective portions of the strap member 220 in contact with the respective teeth 214 and 218. A further approach to the treatment of small bundles is shown in FIG. 23, wherein the head member 240 is provided with an upper bounding surface 242, in which there are found the teeth 244 and a lower bounding surface 246 having teeth 248 thereon. In addition, an extension 250 is provided to control the shape of the loop, formed by the strap body portion 252, as the same is formed about a bundle of articles, such as the articles 254. With the use of the extension 250 it is possible to control the locking engagement of the teeth 244 and 248 with respect to the teeth of the strap body portion 252, despite the relatively sharp breaking of the strap body portion 252 from the head portion 240 about the small bundle 254.

The embodiments of the invention in which an exlusive property or privilege is claimed are defined as follows:

1. A releasable self-locking article bundling strap for placement about at least one article comprising: an elongated body portion having a first end and a second end and having a first planar surface and a second planar surface, parallel with and spaced apart from said first planar surface; said first planar surface having a plurality of first teeth, each of said first teeth having a leading surface sloped in a first direction; said second planar surface having a plurality of second teeth, each of said second teeth having a leading surface sloped in a second direction; a head member having at least one aperture therethrough and capable of being rotated in one of two opposite directions with respect to the plane of said body portion; at least one third tooth extending into said aperture from a first surface of said head member partially defining said aperture, said third tooth having a leading surface sloped in said first direction for lockingly engaging said second teeth to assemble said head member to said body portion at one of said first and second ends, at least one fourth tooth extending into said aperture from a second surface of said head member, opposed to said first surface of said head member, partially defining said aperture; said fourth tooth having a leading surface sloped in said second direction for lockingly engaging said first teeth; the trailing surfaces of each of said first teeth and said fourth tooth and the trailing surfaces of each of said second teeth and said third tooth being complementarily formed whereby any attempted withdrawal of the body portion from the head member aperture, once the body portion has been formed into a loop and the other of said first and second ends has been inserted into said head member aperture, causes said head member to rotate in a first direction causing engagement between said first and fourth teeth and said second and third teeth respectively while permitting the head member to be rotated in a second direction, opposite said first rotation direction, causing said first and second teeth to disengage from said fourth and third teeth respectively permitting said body portion to be withdrawn from said head member aperture.

2. A releasable self-locking article bundling strap as defined in claim 1, wherein said first surface of said head member has a plurality of third teeth thereon.

3. A releasable self-locking article bundling strap as defined in claim 1, wherein said second surface of said head member has a plurality of fourth teeth thereon.

4. A releasable self-locking article bundling strap as defined in claim 1, wherein said first surface of said head member has a plurality of third teeth thereon and said second surface of said head member has a plurality of fourth teeth thereon.

5. A releasable self-locking article bundling strap as defined in claim 1, further comprising: a first pair of marginal ribs on said first planar surface flanking said first plurality of teeth and a second pair of marginal ribs on said second planar surface flanking said second plurality of teeth.

6. A releasable self-locking article bundling strap as defined in claim 5, wherein said third tooth extends in a direction transverse to the length of said body portion a distance approximately equal to the width of said second teeth; and said fourth tooth extends in a direction transverse to the length of said body portion a distance approximately equal to the width of said first teeth.

7. A releasable self-locking article bundling strap as defined in claim 1, further comprising means at said body portion first end to nonreleasably assemble said head member to said body portion at said first end.

8. A releasable self-locking article bundling strap as defined in claim 7, wherein said means comprises a pair of ribs extending transverse to said head member aperture, one rib of said pair of ribs positioned on each of two opposite surfaces of said head member partially defining said aperture and two pairs of protrusions, one pair on each marginal edge of said body portion adjacent said first end thereof; one of said pair of ribs on said head member positioned between the ones of each of said pair of protrusions whereby said head member is loosely, nonreleasably assembled to said body portion.

9. A releasable self-locking article bundling strap as defined in claim 7, wherein said means comprises a pair of detents extending into and partially blocking said head member aperture, one of said detents extending from each of two opposite surfaces of said head member partially defining said aperture; said first end of said body portion positioned below said detents to hold said second teeth in nonreleasable engagement with said third tooth to assemble said head member to said body portion.

10. A releasable self-locking article bundling strap as defined in claim 1, wherein said second end of said body portion is tapered to assist in the insertion of said second end of said body portion into said head member aperture.

11. A releasable self-locking article bundling strap as defined in claim 1, further comprising an assembly indicator on said head member to indicate the direction of insertion of the second end of said body portion into said head member aperture for assembly of the strap into a closed lockable loop.

12. A releasable self-locking article bundling strap as defined in claim 1, wherein said first end of said body portion has a notch therein offset from the longitudinal axis of said body portion; an assembly indicator on said head member and said second end of said body portion is tapered, the peak of the taper being offset with respect to the longitudinal axis of said body portion whereby when said peak of said tapered second end of said body portion is introduced into said head member aperture along a line intermediate said notch in said first end of said body portion and said assembly indicator on said head member correct engagement between said first teeth and said fourth tooth is assured upon later rotation of said head member in said first direction.

13. A releasable self-locking article bundling strap as defined in claim 1, wherein said first and second teeth extend in a direction transverse too the longitudinal axis of said 14. A releasable self-locking article bundling strap as defined in claim 1, wherein said first and second teeth extend in a direction transverse to the longitudinal axis of said body portion; said leading surfaces of said first and second teeth being curvalinear with the axis of curvature of each of said first and Second teeth lying along the longitudinal axis of said body portion.

15. A releasable self-locking article bundling strap as defined in claim 1, wherein said first and second teeth extend in a direction angularly disposed with respect to the longitudinal axis of said body portion.

16. A releasable self-locking article bundling strap as defined in claim 1, wherein each of said first and second teeth is comprised of two segments, a first segment extending at an acute angle with respect to an axis transverse to the longitudinal axis of said body portion and a second segment extending at an obtuse angle with respect to an axis transverse to the longitudinal axis of said body portion, said first and second segments meeting along the longitudinal axis of said body portion.

17. A releasable self-locking article bundling strap as defined in claim 1, further comprising a first pair of marginal ribs on said first planar surface flanking said first plurality of teeth; a third rib on said first planar surface dividing said plurality of first teeth into segments; a second pair of marginal ribs on said second planar surface flanking said second plurality of teeth; a fourth rib on said second planar surface dividing said plurality of second teeth into segments.

18. A releasable self-locking article bundling strap as defined in claim 1, wherein said first and second teeth and said third and fourth tooth have a saw-tooth cross section.

19. A releasable self-locking article bundling strap as defined in claim 1, wherein said first and second teeth and said third and fourth tooth have rectangular cross sections.

20. A releasable self-locking article bundling strap as defined in claim 1, wherein said first and second teeth have rectangular cross sections and are aligned with one another.

21. A releasable self-locking article bundling strap as defined in claim 1, wherein said first and second teeth have rectangular cross sections and said second teeth are offset with respect to said first teeth.

22. A releasable self-locking article bundling strap as defined in claim 1, further comprising support means coupled to said head member to insure engagement of said first teeth with said fourth tooth and said second teeth with said third tooth without regard for the diameter of the loop formed by said body portion.

23. A releasable self-locking article bundling strap as defined in claim 1, further including extension means conpled to said head member to control the shape of said body portion as said body portion is formed into a loop.

* * * * *